No. 664,954. Patented Jan. 1, 1901.
J. M. KLINE.
NUT LOCK.
(Application filed Feb. 28, 1900.)
(No Model.)

Witnesses
F. G. Campbell.
T. H. Shepard.

By his Attorneys,

J. M. Kline Inventor
C. A. Snow & Co.

United States Patent Office.

JAMES M. KLINE, OF BEAVERTOWN, PENNSYLVANIA, ASSIGNOR OF ONE-FIFTH TO SAMUEL A. WETZEL, OF SAME PLACE.

NUT-LOCK.

SPECIFICATION forming part of Letters Patent No. 664,954, dated January 1, 1901.

Application filed February 28, 1900. Serial No. 6,815. (No model.)

*To all whom it may concern:*

Be it known that I, JAMES M. KLINE, a citizen of the United States, residing at Beavertown, in the county of Snyder and State of Pennsylvania, have invented a new and useful Nut-Lock, of which the following is a specification.

This invention relates to nut-locks of that class in which a pin is employed to lock the nut on the bolt; and it consists in the combination and arrangement of parts hereinafter fully described and claimed.

Figure 1:
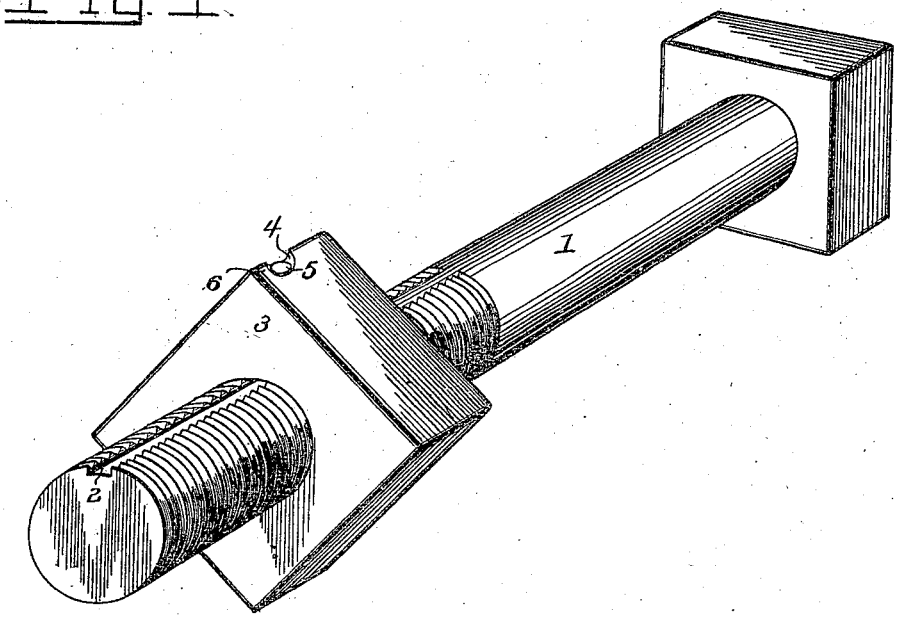
Figure 2:
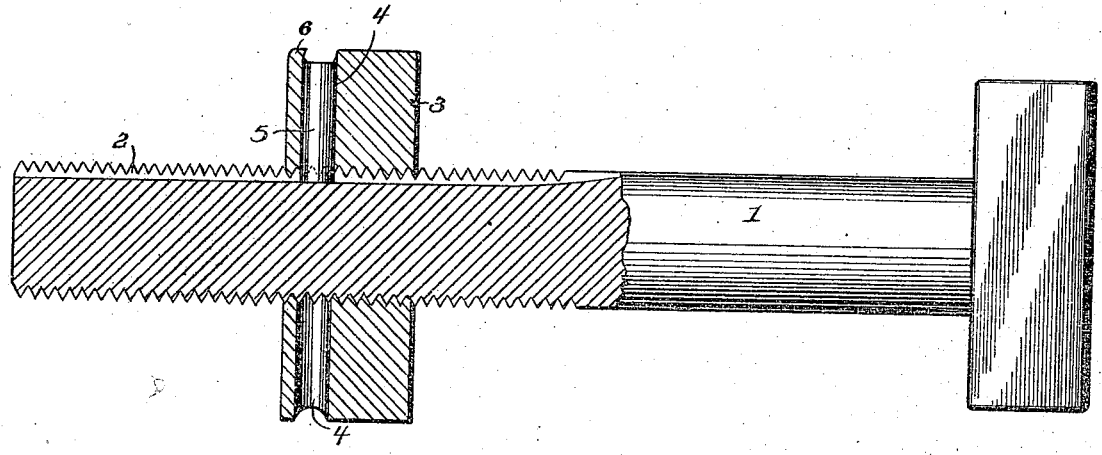

In the drawings, Figure 1 is a perspective view of a nut-lock constructed in accordance with the present invention. Fig. 2 is a longitudinal sectional view thereof, taken through the locking-pin.

1 designates an ordinary bolt having a longitudinal groove 2 extending throughout the screw-threaded portion thereof. Screwed to the bolt in the usual manner is a nut 3, that is provided with a smooth radial opening 4, the inner end of which opens into the screw-threaded bore of the nut and the outer end of which extends to one of the angles or corners of the nut at a point adjacent to the outer face thereof, thereby forming a tongue 6 between the outer end of said opening and the face of the nut.

To lock the nut after it has been properly set, with the opening 4 registering with the groove 2, a suitable smooth locking-pin 5 is inserted into the opening, so that the inner end of the pin may be received within the groove. To secure the pin in engagement with the groove in the bolt, the comparatively thin tongue 6, formed by that portion of the nut at the corner or angle thereof which is between the outer side of the opening and the outer face of the nut, is struck slightly with a punch or other suitable implement to bend the tongue inward, and thereby form an offset which overhangs and engages the outer end of the pin. It will of course be understood that it requires but a slight blow to bend the tongue over the pin sufficiently to prevent accidental displacement thereof, whereby the tongue portion of the nut is displaced or bent but a trifle, and it may be readily bent back and straightened into its normal position by a slight blow from a punch to clear the opening and enable the pin to be removed to free the nut. Thus it will be apparent that the locking-pin may be applied and removed without damaging any parts of the device, and thereby the bolt, the nut, and the pin may be used a number of times.

Although but one groove has been shown in the drawings, it will of course be understood that a plurality of such grooves may be formed in the bolt, and an opening may be formed for each corner of the nut, so that a much firmer adjustment of the latter may be had.

Although a substantially cylindrical locking-pin has been shown in the drawings, it will of course be understood that an angular pin may be employed with equal effect.

Having thus described my invention, I claim—

1. In combination with a bolt having a longitudinal groove in one side, a nut, having an opening communicating at its inner end with said groove, said opening extending to one of the corners or angles of the nut at a point near one face thereof, whereby a tongue is formed between said opening and the face of the nut, a pin in said opening and having its inner end engaged in said groove to prevent the nut from turning, the outer end of the said tongue of the nut being adapted to be bent to form an offset overhanging and engaging the outer end of said pin, to secure the latter from disengagement with the said groove, said tongue being adapted to be straightened out to release said pin, substantially as described.

2. As a new article of manufacture, a nut having an opening, adapted to receive a locking-pin, said opening extending from the threaded bolt-hole to one of the corners or angles of the nut at a point near one face thereof, whereby a tongue is formed between said opening and the face of the nut, the said tongue being adapted to be bent to form an offset in said opening and to be straightened out to clear said opening, whereby a locking-pin may be readily secured in and released from said opening, substantially as described.

In testimony that I claim the foregoing as my own I have hereto affixed my signature in the presence of two witnesses.

JAMES M. KLINE.

Witnesses:
M. PERRY HAHN,
E. E. DOYLE.